(12) United States Patent
Flinsbaugh

(10) Patent No.: US 6,678,271 B1
(45) Date of Patent: Jan. 13, 2004

(54) HIGH PERFORMANCE SYSTEM AND METHOD HAVING A LOCAL BUS AND A GLOBAL BUS

(75) Inventor: Jack Flinsbaugh, San Jose, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/351,268

(22) Filed: Jul. 12, 1999

(51) Int. Cl.[7] .................. H04L 12/56; H04L 12/28; H04J 1/00; H04J 12/66
(52) U.S. Cl. .................. 370/392; 370/489; 370/412; 370/419; 370/420; 370/421; 370/463; 370/480
(58) Field of Search ................... 370/392, 489, 370/480, 463, 419–421, 405, 428, 429, 229–235, 364, 365, 412–414; 709/214, 215, 216, 218, 318

(56) References Cited

U.S. PATENT DOCUMENTS

| | | | | |
|---|---|---|---|---|
| 4,667,322 A | * | 5/1987 | Ulug | 370/452 |
| 5,274,641 A | * | 12/1993 | Shobatake et al. | 370/392 |
| 5,448,564 A | * | 9/1995 | Thor | 370/392 |
| 5,509,117 A | * | 4/1996 | Haug | 395/18.02 |
| 5,517,662 A | * | 5/1996 | Coleman et al. | 395/800 |
| 5,669,009 A | * | 9/1997 | Buktenica et al. | 395/800.35 |
| 6,092,115 A | * | 7/2000 | Choudhury et al. | 709/235 |
| 6,118,792 A | * | 9/2000 | Beshai | 370/468 |
| 6,246,682 B1 | * | 6/2001 | Roy et al. | 370/390 |
| 6,349,394 B1 | * | 2/2002 | Brock et al. | 714/47 |
| 6,373,842 B1 | * | 4/2002 | Coverdale et al. | 370/394 |
| 6,487,212 B1 | * | 11/2002 | Erimli et al. | 370/413 |
| 6,522,188 B1 | * | 2/2003 | Poole | 327/407 |

* cited by examiner

Primary Examiner—Dang Ton
Assistant Examiner—Ron Abelson
(74) Attorney, Agent, or Firm—Blakely Sokoloff Taylor & Zafman LLP

(57) ABSTRACT

An apparatus and method for providing a translation layer between a local bus and a global bus is described. The apparatus has a local bus and a global bus respectively coupled to a local bus gateway and a global bus gateway. A storage unit is coupled to both of the gateways, the storage unit having a traffic unit. Traffic control logic is coupled to at least one of the gateways and to at least one traffic statistic register.

45 Claims, 5 Drawing Sheets

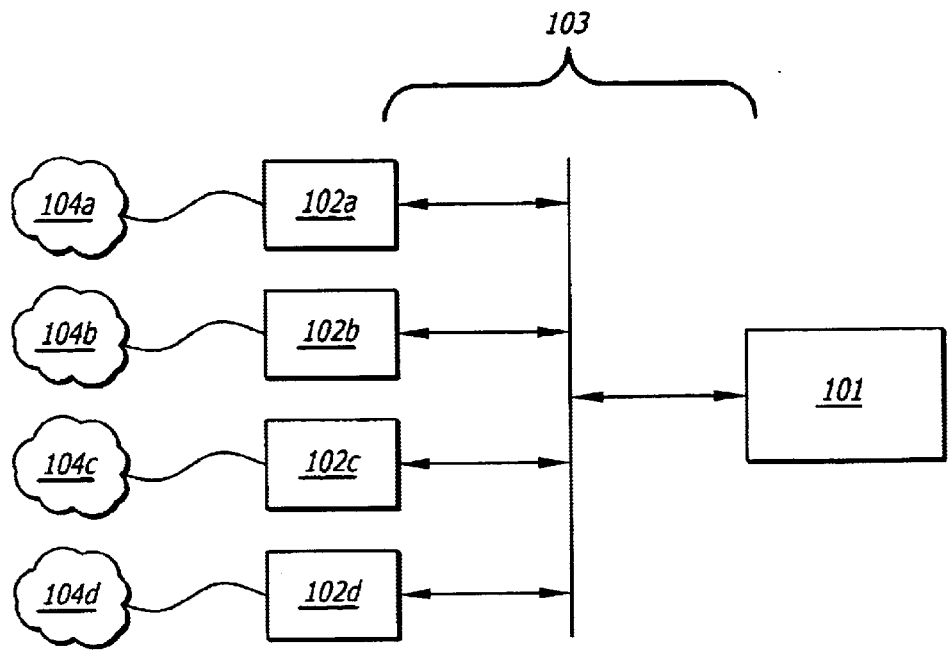
FIG. 1A *(Prior Art)*
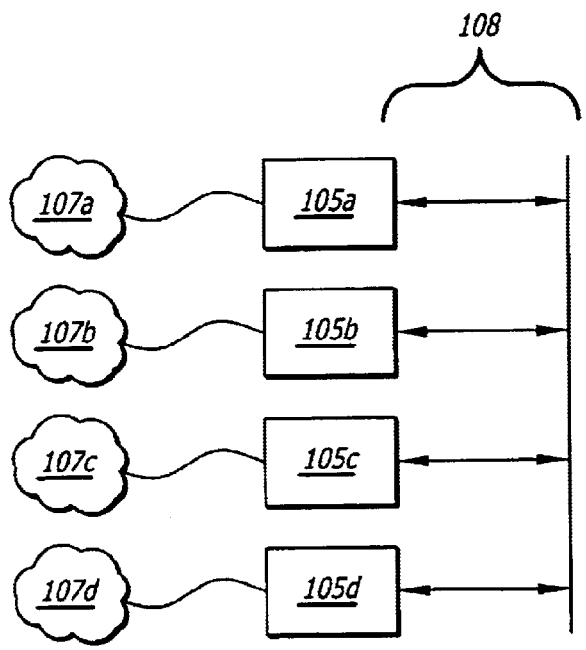
FIG. 1B *(Prior Art)* ic # HIGH PERFORMANCE SYSTEM AND METHOD HAVING A LOCAL BUS AND A GLOBAL BUS

FIELD OF INVENTION

The invention relates in general to system architecture. More specifically, the invention relates to improving the performance of systems having a local bus and a global bus.

BACKGROUND OF THE INVENTION

Advancements in semiconductor technology have enabled more cost effective computing and networking hardware architectures. Traditionally, system intelligence was centrally located within the computer or networking switch or router. Referring to FIG. 1a, computing or networking systems traditionally comprise a motherboard 101, a plurality of adapter cards 102a–d, all of which are communicatively coupled through a system backplane 103.

Motherboards 101 are the traditional location of a system's intelligence. In the case of computing systems, the motherboard 101 is mostly responsible for running the operating system and application software. In the case of networking switches or routers, the motherboard 101 is responsible for identifying the destination address of each incoming traffic flow unit (such as a packet or cell). Computing system and router motherboards 101 are typically comprised of one or more microprocessors while switch motherboards 101 are typically comprised of application specific integrated circuits (ASICs).

In both computing and networking systems, traditionally, the adapter cards 102a–d may be viewed as having low levels of intelligence. That is, adapter cards 102a–d have traditionally been used for merely translating traffic flow between the motherboard 101 and various external connections 104a–d outside the system. In computing systems, the external connections may comprise the display (i.e., the computer screen), a Local Area Network (LAN) and speakers (e.g., for multimedia applications). In networking systems, the external connections 104a–d are typically a network.

In traditional systems, the intelligence is centrally located on the motherboard 101 because large semiconductor chips are needed to implement the intelligent functionality and its supporting logic. Thus implementing the system intelligence traditionally requires placing multiple large chips on the same card (the motherboard 101). Populating multiple large chips on a single card consumes significant board space, thus motherboards 101 tend to be large form factor cards. Adapter cards 102a–d are typically smaller form factor cards since they merely perform translation layer functionality. That is, adapter cards tend to comprise smaller semiconductor chips since their functionality is limited.

Pushing more intelligence onto the adapter card is typically prohibitive at traditional transistor integration levels since it involves placing large chips on each adapter card. The increased size of each adapter card 102a–d needed to accommodate computing or switching intelligence there, results in greater total boardspace consumption by the system as compared to a centralized, motherboard approach. However, increased transistor level integration levels has resulted in smaller chips for a fixed functionality or intelligence level. Thus, system level intelligence may now be pushed onto the adapter cards 102a–d themselves while maintaining cost effectiveness of the overall system. The result is a smaller system, as shown in FIG. 1b, that has no mother board and slightly larger adapter cards 105a–d. For networking systems, each adapter card 105a–d has the intelligence to route incoming/ingress traffic to the appropriate outgoing/egress adapter card 105a–d.

A problem with implementing the intelligent adapter card architecture of FIG. 1b (particularly for multiport adapter cards) however, concerns managing the traffic flow between the connection 107a–d and the backplane 108. Specifically, the bandwidth associated with backplane 108 is typically higher than the bandwidth associated with the local routing capabilities of the adapter cards 105a–d. If designers do not account for these performance discrepancies (and integrate precautions into the intelligence of the adapter card), traffic units (such as packets, cells or words) may be dropped by the system at an unacceptably high rate.

Thus, what is needed is a system and method for overcoming the above described performance discrepancies.

SUMMARY OF THE INVENTION

An apparatus and method for providing a translation layer between a local bus and a global bus is described. The apparatus has a local bus and a global bus respectively coupled to a local bus gateway and a global bus gateway. A storage unit is coupled to both of the gateways, the storage unit having a traffic unit. Traffic control logic is coupled to at least one of the gateways and to at least one traffic statistic register.

BRIEF DESCRIPTION OF THE DRAWINGS

The present invention is illustrated by way of example and not limitation in the figures of the accompanying drawings, in which like references indicate similar elements, and in which:

FIG. 1a shows a traditional system architecture.

FIG. 1b shows a recent system architecture stemming from silicon technology improvements.

DETAILED DESCRIPTION

An apparatus and method for providing a translation layer between a local bus and a global bus is described. The apparatus has a local bus and a global bus respectively coupled to a local bus gateway and a global bus gateway. A storage unit is coupled to both of the gateways, the storage unit having a traffic unit. Traffic control logic is coupled to at least one of the gateways and to at least one traffic statistic register.

Figure 2:
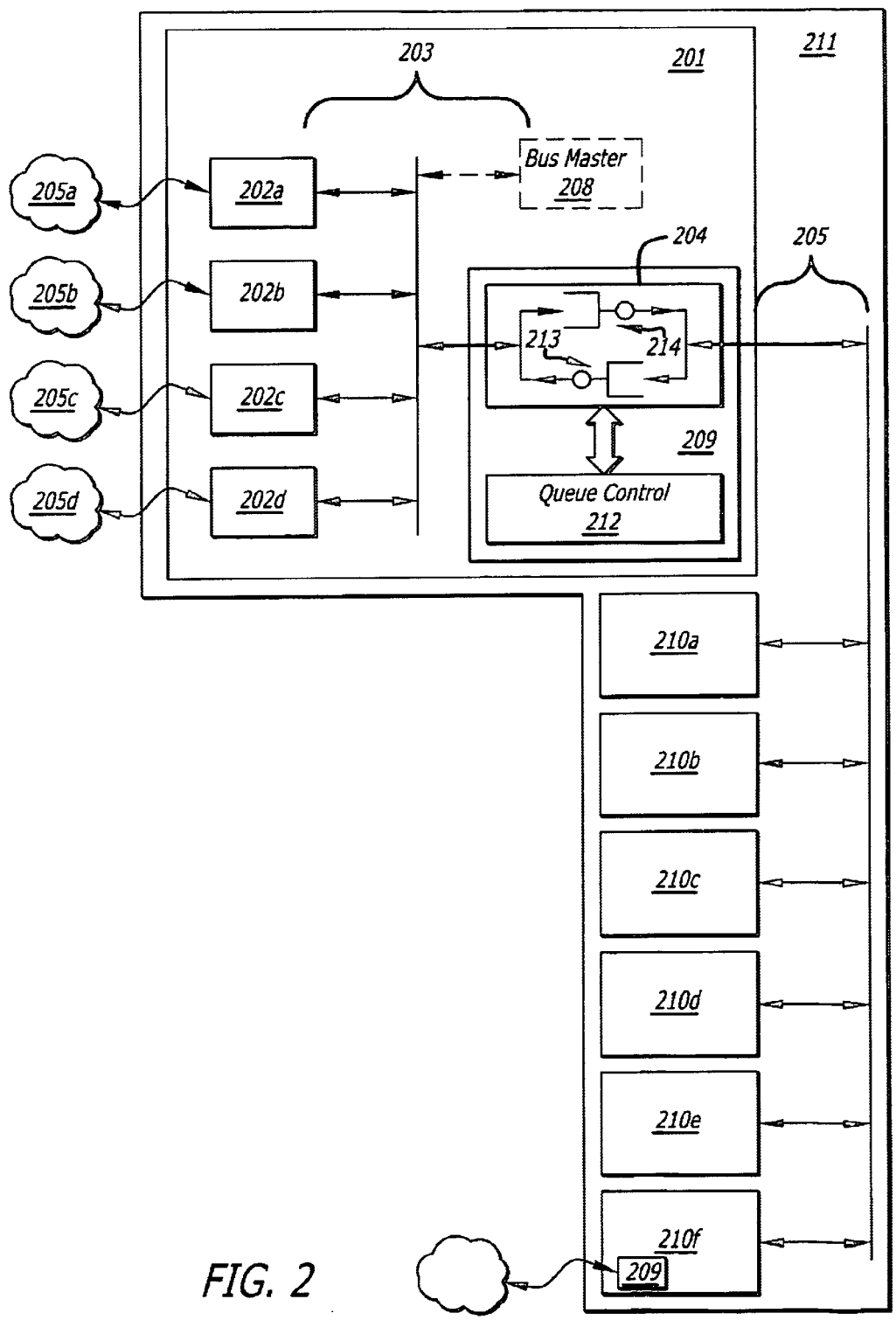
FIG. 2 shows an exemplary system having a local bus and a global bus.

Various embodiments apply to multiport adapter card applications. FIG. 2, shows an architecture of a multiport adapter card 201 having multiple local ports 202a–d, a local bus 203, an interface layer 204 and a backplane 205. Multiport adapter cards 201 are adapter cards having more than one connection per adapter card. That is, comparing the adapter cards 102a–d, 105a–d of FIG. 1 with adapter card 201 of FIG. 2, note that each adapter card 102a–d, 105a–d supports only one connection 104a–d, 107a–d while adapter card 201 supports multiple connections 205a–d per adapter card. Local ports are ports on the adapter card being considered. Remote ports (e.g., remote port 209) are ports on adapter cards other than the adapter card being considered. Similarly, such adapter cards 210a–f may also be referred to as remote adapter cards.

For networking applications, ingress ports process traffic units entering the system 211 while egress ports process traffic units leaving the system 211. Typically, each port 202a–d has an ingress port and an egress port. Although not explicitly shown in FIG. 2, the presence of an ingress port and an egress port within each port 202a–d is implied by the bidirectional traffic flow indicated between each port 202a–d and its corresponding connection 205a–d as well as the local bus 203.

For computing applications, such as a server, the traffic unit is typically already within the system (such as within a magnetic storage unit or semiconductor memory). Nevertheless such traffic units may be deemed ingress/egress as they enter/leave the system from the functional component that stores them. It is useful to note that a multiport adapter card in a server environment (i.e., computing application) is an adapter card or other form of I/O channel that supports a plurality of storage units.

In this respect, returning to networking applications, ports (whether ingress or egress) are network interfaces. Network interfaces are physical connections to a network that comply with the applicable network standard or specification. Network interfaces include, for example, Ethernet (10, 100 and 1000 Mb/s) interfaces, Token Ring interfaces, T1 or other TDM interfaces, ATM interfaces, etc. For computing applications ports are usually storage elements such as a disk drive or flash memory unit.

Traffic units are any basic organization of data used to define information blocks requiring transfer within the system. For example, a traffic unit may be a packet comprising random "customer" data encapsulated with a header. The random customer data is typically the information block requiring transfer within the system, such as an e-mail or file or a portion thereof. Another traffic unit may also be a cell, such as an ATM cell. Cells are similar to packets in that they contain random data and a header. Typically, however, cell headers emphasize a "path" identifier while packet headers emphasize a "destination" (and usually a "source") identifier.

Another traffic unit embodiment includes a "time slot" typically found in time division multiplexed (TDM) frames (such as T1 or E1 frames). Still other traffic units may comprise frames which are collections of packets, cells and/or time slots. Traffic units may also comprise a data word line or address word line, such as those used within computing systems. Traffic units may also be modified, once or more, during their travel through the system 211. For example, a packet header may be changed in order to update a node destination address. In other cases the traffic units may be unchanged as they traverse the system 211 with respect to their status before entering the system 211.

Although both computing and networking applications are within the scope of the invention, the following discussion is directed mostly to a networking application. The networking example discussed ahead simplifies the discussion but, again, the invention should not be limited to just networking applications.

Intelligently routing traffic in a multiport adapter card 201 environment involves sending traffic "on card" to a local port 202a–d or "off card" across the backplane 205. That is, ingress traffic arriving from a local port (e.g., local port 202a) may have a destination address that corresponds to either: 1) another local port (e.g., local port 202b); or 2) a remote port on another adapter card. In the former case the traffic unit is sent across the local bus 203 from the ingress local port (e.g., at local port 202a) to the egress local port (e.g., at local port 202b).

In the later case ingress traffic is sent from the ingress local port (e.g., at local port 202a) across the local bus 203 to the interface layer 204. The interface layer 204 then sends the traffic unit across the backplane 205 to a remote adapter card (e.g., adapter card 210f) having a remote egress port (e.g., at remote port 209). The backplane 205 typically comprises a second bus, referred to as a global bus 205, that communicatively couples adapter card 201 with the remote adapter cards 210a–f. Thus the term backplane 205 and global bus may be used interchangeably.

Depending on the architecture of the local bus 203, as described later, transfer of ingress traffic units in either case (i.e., transfer to a local egress port or a remote egress port) may or may not involve interception by a bus master unit 208. Thus bus master unit 208 is drawn with hatched lines. A bus master unit 208, if employed, is responsible for controlling the utilization of the local bus 203 by the various blocks attached to it (e.g., ports 202a–d and interface layer 204 in FIG. 2). Applications that do not employ a bus master unit 208 typically distribute embedded fairness algorithms to each of these blocks such that they share bus utilization control functionality.

As mentioned above, a problem with multiport adapter cards involves the difference in performance between the two buses 203, 205. Typically, the global bus 205 has higher performance than the local bus since there is usually more remote traffic than local traffic. That is, most ingress traffic units require transfer across the global bus 205 to a remote adapter card. As such, the global bus 205 needs more bandwidth than the local bus 203. In one LAN switch embodiment, the global bus 205 has 5.12 Gb/s of available bandwidth while the local bus 203 has 2.56 Gb/s of available bandwidth.

Available bandwidth is the maximum total traffic rate sustainable on the bus as a whole over a period of time. It is possible that over a period of time all bus traffic flows in one direction (e.g., ingress). For example, referring to the aforementioned LAN switch embodiment, it is possible that 2.56 Gb/s of traffic flows in one direction over a period of time. Typically, however, even in short periods of time, traffic flows bidirectionally (i.e., in both directions). In the LAN switch embodiment, the total bidirectional utilized bandwidth must be 2.56 Gb/s or less. For example, over a period of time traffic flows in an ingress direction at 2 Gb/s and in an egress direction at 0.5 Gb/s.

In some worst case like conditions, the difference in bus performance between local bus 203 and global bus 205 causes dropped traffic units. For example, in some instances multiple remote adapter cards 210a–f may target adapter card 201 as the proper destination for their ingress traffic. In this case, the full available bandwidth of the global bus 205 (e.g., 5.12 Gb/s worth of traffic in the aforementioned LAN switch embodiment) is presented as offered load to local bus 203 of the adapter card 201. Since the local bus 203 has less bandwidth (e.g., 2.56 Gb/s in the same LAN switch embodiment) than the global bus 205, the adapter card 201 simply cannot immediately service the offered load. In order to reduce the number of dropped traffic units, an egress queue 213 is used to absorb the local bus's oversubscription to the global bus 205. Oversubscription is the difference between the worst case offered load condition (e.g., 5.12 Gb/s from the global bus 205) and the best case service rate condition (e.g., 2.56 Gb/s from the local bus 203).

Furthermore, the global bus 205 may be oversubscribed to the system 211 as a whole. That is, the total offered load to the system 211 in the form of ingress traffic units arriving from every ingress port in the system (including all the remote cards 210a–f) exceeds the bandwidth of the global bus 205. For example, in the aforementioned LAN switch embodiment there are forty-eight ports per adapter card, each port capable of offering 100 Mb/s in an ingress direction. This results in a worst case condition of 4.8 Gb/s of total offered load to the system 211 per adapter card.

Under this and similar worse case conditions, the local bus 203 will drop ingress traffic units beyond 2.56 Gb/s, resulting in 2.56 Gb/s of offered load to the global bus 205 per adapter card (assuming all ingress traffic units have remote adapter card destinations). If more than two adapter cards are experiencing similar ingress conditions, more than 5.12 Gb/s of offered load is presented by the local bus 203 to the global bus 205 which cannot immediately service all the ingress traffic units. In order to reduce the number of dropped traffic units, an ingress queue 214 is used to absorb the global bus's oversubscription as to the total number of supported connections by the system 211.

Queues are typically characterized by two parameters: depth and service rate. Service rate aspects are discussed further ahead. The depth of each queue 213, 214 helps determine how many traffic units are ultimately dropped. A queue's depth is the maximum number of traffic units the particular queue can store before it overflows (i.e., drops incoming traffic units). Thus, a queue's depth is typically implemented as a storage unit such as a semiconductor memory device. Deeper queue embodiments will drop comparatively less traffic units than more shallow queue embodiments for a fixed oversubscription condition. The amount of depth utilized per queue 213, 214 depends upon a number of factors. The primary ones include: 1) the amount of oversubscription; 2) guaranteed quality of service parameters specified by the system (e.g., such as dropped traffic unit rates); 3) cost considerations (i.e., more queue depth results in more memory and thus higher cost); 4) space conditions (i.e., more queue depth may result in more memory chips or bigger memory chips). Since these factors may vary from system to system, the "right amount" of queue depth should be determined by the designer on a case by case basis. Thus, the total queue depth may be seen as a fixed quantity for each system design.

Queue depth is typically determined on a "queue-by-queue" basis. That is, the above factors are considered separately for each queue. For example, a permanent (or "fixed") queue depth is determined for the egress queue 213 alone and then a fixed queue depth is determined for the ingress queue 214 alone. However, since both queues 213, 214 are typically implemented with semiconductor memory cells (such as SRAM or DRAM), it is more efficient to view the total queue depth as a whole rather than on a queue by queue basis.

That is, allow for dynamically configurable ingress 214 and egress 213 queue depths via memory cell sharing between the two queues. A problem with fixed depth queues (that result from the queue by queue approach) is inefficient utilization of memory resources. For example, under certain system traffic conditions one queue (e.g., the ingress queue 214) may be presented with high offered load to the point of memory space saturation and subsequent overflow. Simultaneously, the neighboring queue (e.g., egress queue 213) may have near zero offered load resulting in high availability of memory space. When viewed as whole, this design inefficiently utilizes the memory space since traffic units are dropped while memory cells are available.

Figure 3A:
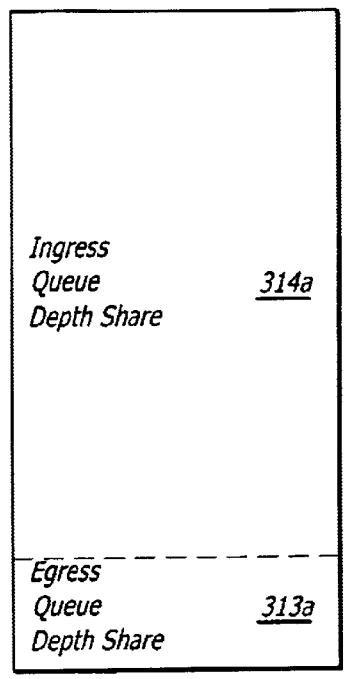
FIG. 3a shows a first memory space configuration according to an embodiment of the invention.

A better approach is to view all the memory associated with both queues 213, 214 as a whole such that the total memory space is shared between them. This approach mandates a queue control unit 212 capable of dynamically controlling the depth of each queue 213, 214 in response to current traffic conditions. Using the aforementioned case and referring to FIGS. 2 and 3a, the control unit 212 sets up the total memory space 301a such that the depth 314a of ingress queue 214 corresponds to nearly all the total memory space 301a (e.g., 90%) while the depth 313a of egress queue 213 corresponds to a small minority share of the total memory space 301a (e.g., 10%). In this case fewer traffic units are dropped since, as compared to the fixed queue approach, the ingress queue 214 is effectively "given" the available cell space of the egress queue 213.

Furthermore, the queue control unit 212 may be dynamic. This means it has the ability to "reset" the memory space configuration (that determines the depth of each queue 213,214) during normal machine operation. That is, referring to FIG. 3b, assume the offered load conditions suddenly reverse themselves from the case of FIG. 3a. In such a situation the ingress queue's 214 offered load suddenly drops from a maximum rate to near zero while the egress queue's 213 offered load suddenly expands from near zero to a maximum rate. The control unit may then sense the new traffic condition and reverse the memory space arrangement 301a of FIG. 3a such that the ingress queue 214 depth corresponds to a much smaller percentage 314b (e.g., 10%) of the total memory space 301b than the memory space percentage 313b (e.g., 90%) allotted for the egress queue 213 depth.

Memory space settings are: 1) the specific addresses that define the queue boundaries or 2) values from which such addresses may be determined. Thus, regardless, memory space settings in some manner correspond to specific address settings of the memory device(s). This correspondence is typically referred to as an address map. That is, referring to FIG. 3b, memory cells located between memory addresses 302 and 303 correspond to the memory space utilized to implement the ingress queue depth 314b while memory cells located between memory addresses 303 and 304 correspond to the memory space utilized to implement the egress queue depth 313b.

Figure 3B:
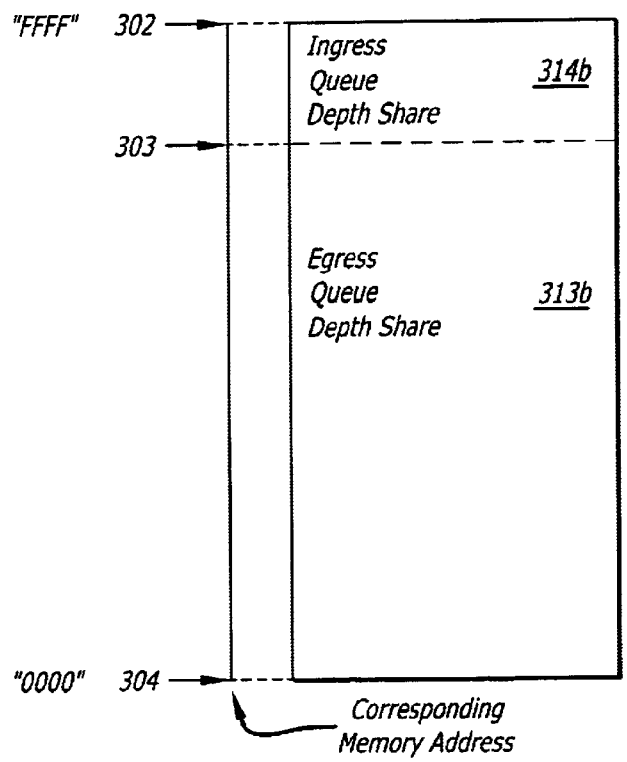
FIG. 3b shows a second memory space configuration according to an embodiment of the invention.

Typically memory address ends 302, 304 correspond to either "all zeroes" (e.g., "0000") or "all F's" in hexadecimal systems (e.g., "FFFF") since they are they are the first and last memory addresses of the memory space 301b. For example, as shown in FIG. 3b, memory address 304 is "0000" and memory address 302 is "FFFF". Thus, since the memory address ends 302,304 are fixed and known, only the "boundary" memory space setting 303 needs to be tracked (since it may be varied). The "boundary" memory space setting 303 corresponds to the boundary between the egress and ingress queue depths 313, 314.

Before discussing this aspect further, a more detailed understanding of the architecture of the translation unit 204 of FIG. 2 is helpful. The translation layer 204 (which contains both queues 213, 214 and queue control unit 212) is responsible for: 1) implementing the dropping of traffic units during overflow conditions for the ingress 214 and egress 213 queues; 2) implementing the storage of traffic units into ingress 214 and egress 213 queues when overflow conditions do not exist; and 3) implementing the servicing of ingress 214 and egress 213 queues (i.e., removing traffic units from queue 213, 214 storage when applicable bus 203, 205 resources are available).

Figure 4:
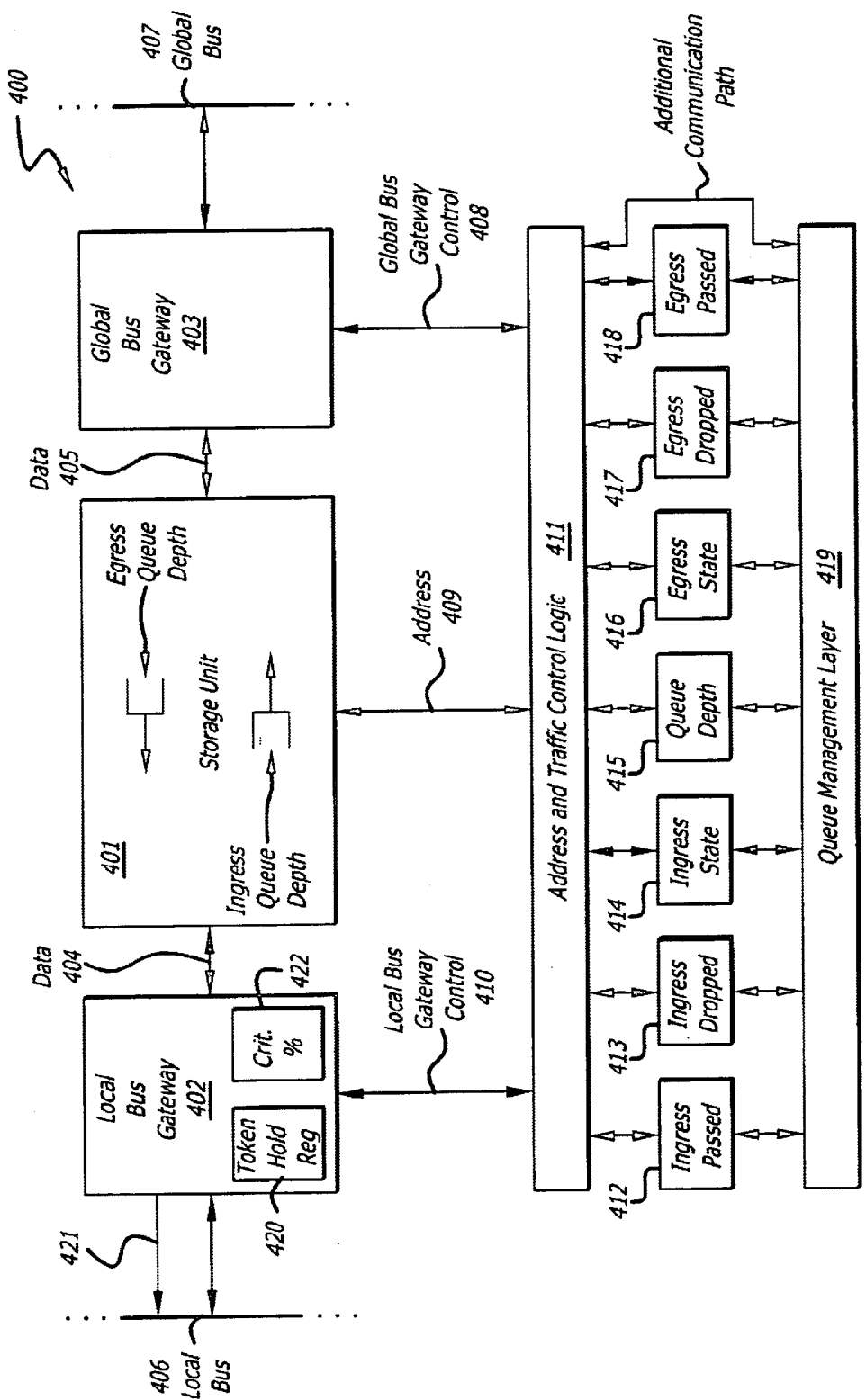
FIG. 4 shows an embodiment of the translation layer 204 of FIG. 2.

FIG. 4 shows a more detailed depiction of the architecture 400 for the translation layer 204 of FIG. 2. Queue storage 401 may be implemented with, for example, semiconductor memory devices such as SRAM or DRAM. The queue control unit 212 of FIG. 2 corresponds to (in FIG. 4): 1) a local bus gateway 402; 2) a global bus gateway 403; 3) address and "traffic control" logic block 411; 4) gateway control lines 408, 410; and 5) address lines 409. The queue management layer 419 may also be implemented within queue control unit 212 as discussed ahead.

Thus comparing FIG. 2 with FIG. 4, queues 213, 214 in a static condition are little more than queue storage 401 while the activity of these queues (i.e., queues 213, 214 in a dynamic condition such as the dropping of traffic units, servicing, etc.) is implemented through queue control unit 212 which is implemented as just described above. It is important to note that the local bus gateway 402 and global bus gateway 403 may be integrated into one chip. In such an embodiment, data buses 404, 405 may merge into a single data bus. Whether the gateways 402, 403 are integrated together or not, however, either a single port or dual port architecture may be used for storage unit 401. Furthermore, the address control of block 411 may be integrated into the gateways 402, 403 such that an address bus couples the storage unit 401 to the gateways 402, 403.

Also shown in FIG. 4 is a queue management layer 419. The queue management layer 419 is responsible for determining the aforementioned memory space settings. As mentioned above, memory space settings are: 1) the specific addresses that define the queue boundaries or 2) values from which such addresses may be determined. Queue management layer 419, once it determines a memory space setting, stores it into queue depth register 415. As discussed, just the boundary memory space setting needs to be understood (e.g., setting 303 of FIG. 3).

There are various forms of memory space settings. In one embodiment, the memory space setting is a memory address value. That is, referring back to FIG. 3b, the critical memory space setting corresponds to memory address 303 since memory address 303 is the dividing line between the ingress queue depth share 314b and the egress queue depth share 313b. From this memory setting value in queue depth register 415, the logic of block 411 can determine the exact depth of both the ingress queue and the egress queue.

Other embodiments of memory space settings may be used. For example, memory space settings may be a percentage value that corresponds to the percentage of total memory space given to one of the queues (either egress or ingress). Again, logic block 411 can determine the exact depth of both of the queues provided it knows the total storage space in storage unit 401. From this value, logic block 411 can also determine the exact memory address that corresponds to the dividing line between the two queues (e.g., memory address 303 of FIG. 3).

Also, rather than a percentage value, a memory space setting may be a number that corresponds to queue depth in absolute terms such as the total number of traffic units or the amount of bits (e.g., two megabits) that may be stored in one of the queues. Again, block 411 can determine the exact depth of both queues as well as the applicable memory addresses. Also, the queue depth register 415 may be contain queue depth forms (e.g., address value, percentage value, traffic units, bits) for both the ingress queue and the egress queue rather than just one of the queues. This would reduce determination logic within block 411 as logic block 411 performs a simple look-up from the depth queue register 415.

Recall that the memory space settings may change dynamically in light of current traffic conditions. That is, referring briefly back to FIG. 3, the boundary memory space setting 303 changed from FIG. 3a to FIG. 3b as a result of changed offered load conditions. The queue management layer 419 is responsible for understanding traffic conditions in order to adjust the memory space setting within queue depth register 415. Referring back to FIG. 2, the methods used to monitor traffic conditions and make these determinations may be executed in hardware (such as semiconductor logic gates) within the queue control unit 212 or elsewhere. These methods may also be determined in software that runs on a processor.

If performed in software, the processor may be located in any of a number of locations. For example, the "processor" may be: 1) a processing core associated with a system-on-a-chip (e.g., if the queue control unit 212 is implemented as a system-on-a-chip); 2) a separate microprocessor (not shown) located on the adapter card 201; 3) a "control" adapter card (not shown) in the system 211 used only for system 211 maintenance and configuration (as opposed to the system's main routing or switching intelligence); or even 4) on a remote control station outside the system 211 (e.g., a SNMP based network control unit) communicatively indirectly coupled to the queue control unit 212 via a network connection to the system.

In the later two cases, the queue control unit 212 typically needs some form of communicative coupling off of the adapter card 201 and therefore should have some form of access to the local bus 203 or the global bus 205. Alternatively, the control unit could may make offcard communications by inserting its communication traffic units into the ingress and egress queues 214, 213 directly. Nevertheless, referring back to FIG. 4, the queue management layer 419 may be performed in hardware or. software or a combination thereof, depending on the specific mix chosen by the designer. Furthermore, the queue management layer 419 may be performed within the queue control unit 212, elsewhere on the adapter card 201, off the adapter card 201 or a combination thereof depending, again, on the specific mix chosen by the designer.

Contuining with a discussion of the queue management layer 419, recall this layer is also responsible for monitoring current traffic conditions before making a determination as to a boundary memory space change. Monitoring traffic conditions is realized by observing or having reported traffic statistics which may be tabulated in various counters or registers. By registers or counters it is meant these statistics may be kept in a counter or a register. Hereafter, only the term registers will be used, but note either counters or registers are intended to apply.

Various traffic statistic registers 412, 413, 414, 416, 417, 418 are shown in the embodiment of FIG. 4. Traffic statistic registers contain information regarding system performance and/or traffic conditions within the system that a network maintenance operator would consider usefull in managing the network that comprises the system or the system itself. In the embodiment of FIG. 4, these include: 1) the ingress passed register 412; 2) the ingress dropped register 413; 3) the ingress state register 414; 4) the egress state register 416; 5) the egress dropped register 417; 6) the egress passed register 418.

The ingress passed register 412 tracks the number of traffic units serviced from the ingress queue by the global bus 407 while the egress passed register 418 tracks the number of traffic units serviced from the egress queue by the local bus 406. Depending on designer choice, a traffic unit may be deemed "passed" when: 1) it enters the queue (i.e., is stored into storage unit 401) since it will ultimately be serviced at some point or 2) when it actually leaves the queue (i.e., is removed from storage unit 401) and enters its respective bus (i.e., local bus 406 for the egress queue and global bus 407 for the ingress queue).

FIG. 4 implies the former embodiment since the egress passed register 418 sits near the global bus 407 and the ingress passed register sits near the local bus 406. Registers 412, 418 count up to their maximum value and then:"rollover" to binary zero. Thus these registers are a continual count of the absolute number of packets passed through either queue.

The egress dropped register 417 and ingress dropped register 413 tracks the number of traffic units that are "dropped" by either queue. That is, these registers track the number of traffic units that are offered to a queue and never stored in storage unit 401. The ingress state register 414 and egress state register 416 track the number of traffic units currently stored within storage unit 401. Thus, the applicable state register is incremented when a traffic unit is stored in the storage unit 401 and the applicable state register is decremented when a traffic unit is removed from storage unit 401. As a queue "fills up", its corresponding state register counts up and as a queue "empties out" its corresponding state register counts down.

By maintaining an awareness of the status of the traffic statistic registers, the queue management layer 419 is able to gain an understanding of traffic flow conditions within the system, their effects on the ingress and egress queues and configure/program the ingress and egress queue depths accordingly. Also, note that it may be cumbersome to update the queue management layer 419 every time the queue state registers 414, 416 change value. Furthermore, it may redundant to do so in light of the information that may be gained from monitoring only the passed 412, 418 and dropped 413, 417 queues. Thus some embodiments may chose not to communicate queue state information (i.e., the ingress state 414 and egress state 416 values) to the queue management layer 419.

Other embodiments, however, may do the opposite. That is, these embodiments may only convey queue state information within state registers 414, 416 to the queue management layer 419. Still other embodiments may choose to convey all seven registers 412–418 to the queue management layer. Whichever combination of registers the designer chooses to communicate to the queue management layer 419, the combination should be sufficient for the queue management layer 419 to gain an understanding of how "full" or "empty" each queue (i.e., ingress and egress) is. Also, the queue management layer 419 should maintain the ability to "reset" any of the registers as well 412–418.

Thus, so far, the discussion has explained how the queue management layer 419 is able to understand and then configure the queue depths of both the ingress and egress queues. However, once the queue depths have been determined, the "passed" and "dropped" rates of the queues should be affected. The following discussion concerns the methods associated with passing traffic units through the queue and dropping traffic units when they request entry to a full queue.

The determination to drop or pass a traffic unit results from the execution of a threshold method. There is a threshold method performed for both queues. During the ingress threshold method: 1) the local bus gateway 402 accepts traffic units from the local bus 406 destined for the global bus 407; 2) the local bus gateway 402 signifies to block 411 (via local bus gateway control lines 410) that an ingress traffic unit has arrived; 3) the traffic control logic associated with block 411 compares the ingress state register 414 value (i.e., how many traffic units are currently in the ingress queue) against its knowledge of the depth the ingress queue (e.g., by checking the queue depth register 415 or determining the ingress queue depth from the value stored in the queue depth register 415) to make a determination whether or not there is room in the ingress queue for the newly arrived traffic unit.

The egress threshold method operates in a similar manner. That is: 1) the global bus gateway 403 accepts traffic units from the global bus 407 destined for the local bus 406; 2) the global bus gateway 403 signifies to block 411 (via global bus gateway control lines 418) that a traffic unit has arrived; 3) the traffic control logic associated with block 411 compares the egress state register 416 value (i.e., how many traffic units are currently in the egress queue) against its knowledge of the depth the egress queue (e.g., by checking the queue depth register 415 or determining the egress queue depth from the value stored in the queue depth register 415) to make a determination whether or not there is room in the egress queue for the newly arrived traffic unit.

Thus, both gateways 402, 403 typically have some form of buffering to temporarily house traffic units accepted from their respective buses 406, 407 but have not been cleared for storage into the storage unit 401, pending completion of the threshold methods which determine whether or not room is available in the respective queues. The buffering within the gateways 402, 403 thus free both buses 406, 407 to continue servicing other requests while a threshold determination is made.

After the threshold method is performed (i.e., a determination is made whether room exists in the queue) the address and traffic control block 411, storage unit 411 and gateways 402, 403 together store the traffic unit if space is available in the queue or flush the traffic unit if space is not available in the queue.

Thus, if space is available within the ingress queue, the address logic associated with block 411 sets up the appropriate address value on address bus 409 (which is typically a binary increment above the address of the last traffic unit stored in the ingress queue) and clocks the traffic unit (or signifies the traffic unit should be clocked) from the local bus gateway 402 to the storage unit 401. If no room is available in the ingress queue, the traffic control logic associated with block 411 indicates to the local bus gateway 402 (via local bus gateway control lines 410) that the traffic unit should be flushed. That is, the register or storage circuitry used to buffer the traffic unit should be cleared or may be overwritten.

If space is available within the egress queue, the address logic associated with block 411 sets up the appropriate address value on address bus 409 (which is typically a binary increment above the address of the last traffic unit stored in the egress queue) and clocks the traffic unit (or signifies the traffic unit should be clocked) from the global bus gateway 403 to the storage unit 401. If no room is available in the egress queue, the traffic control logic associated with block 411 indicates to the global bus gateway 403 (via global bus gateway control lines 408) that the traffic unit should be flushed.

Furthermore, the traffic control logic associated with block 411 is responsible for updating the applicable traffic statistic registers (412, 413, 414 for the ingress queue and 416, 417, 418 for the egress queue). For example, if the traffic control logic determines a traffic unit buffered in the local bus gateway 403 should be flushed, it increments the ingress dropped register 413. Also, if a determination is made that a traffic unit buffered in the local bus gateway 402 should be stored in the storage unit 401, the traffic control logic should increment the ingress state register 414 or the ingress passed register 412 or both. The traffic control logic should respond in a corresponding manner as to the egress queue.

Thus traffic control logic (e.g., associated with block 411 of FIG. 4) is responsible for determining whether traffic units should be passed or dropped and also updating the traffic statistic registers (such as registers 412–414, 416–418 of FIG. 4) accordingly. The address logic associated with block 411 is responsible for placing the proper address on the storage unit 401 such that a first in first out (FIFO) queue is implemented. The address logic uses the memory space setting value in the queue depth register 415 to implement the dynamic programmable/configurable queue depth functionality.

The gateways 402, 403 are responsible for providing the proper interface with their respective bus 406, 407 so they can collect traffic units from their respective bus and transmit traffic units onto their respective bus. Furthermore, gateways interface with the storage unit 401 to read/write traffic units from/to the storage unit. The gateways 402, 403 should also buffer the traffic units to offload their respective buses 406, 407. If these buffers are full, the gateways 402, 403 may reject further offered load from the bus 406, 407. Again, other embodiments may merge the gateway 402, 403 and address/traffic control block 411 into a single block that separates the storage unit 401 from the buses 406, 407 and queue management layer 419.

Also, alternatively, the address logic, traffic control logic or both, associated with block 411, may be removed from block 411 and incorporated into the gateways 402, 403. Again as an alternative, the traffic control logic associated with block 411 may be coupled to either or both buses 406, 407 (not shown in FIG. 4). By coupling the traffic control logic to a bus 406, 407 it can "snoop" the bus and identify traffic units destined for its respective gateway (e.g., local bus gateway 402 for the local bus 406). As such the traffic control logic is able to initiate its threshold method (to check to see if there's room to store the traffic unit) without a "triggering" control signal from the gateway. Thus, the traffic control logic simply tells the gateway whether or not to store or flush the traffic unit without an initial indication from the gateway that a traffic unit has arrived. The traffic control logic can also inform the gateway not to accept any traffic units from the bus as well.

When traffic units are serviced from the queue (i.e., traffic units are read from storage unit 401 and placed onto their destination bus (e.g., global bus 407 in the case of the ingress queue) a similar process is implemented. As long as there is traffic stored in the queue the gateways should be requesting service from the destination bus when possible. That is, if the ingress queue has stored traffic units, the global bus gateway 403 should request service from the global bus 407. Similarly, if the egress queue has stored traffic units, the local bus gateway 402 should request service from the local bus 406. Furthermore, as traffic units are serviced, the traffic control logic should decrement the applicable state register 414, 416 and increment the applicable passed register 412, 418 if the passed register was not updated when the traffic unit was first accepted.

In one embodiment, when such service is granted, the address bus 409 is set up with the appropriate address and the traffic is read into the respective gateway. In other embodiments, the gateway may have buffering in the "onto bus" (i.e., outbound) direction. That is, traffic units may be read from storage unit 401 sometime before service is requested for that particular traffic unit. In these embodiments, the queue depth register may or may not account for the added queue space represented by the outbound buffer in the gateway. In either case, traffic units should be clocked into the gateway outbound buffer when space is available. The gateway should request service whenever a traffic unit is in its outbound buffer.

A word about buses 406, 407 needs mention. Specifically, various bus topologies may be used such as token buses (e.g., the holder of a token is the bus master) or broadcast buses with or without collision detect (e.g., requests are broadcast on the bus). These buses may be industry standard based (such as Token Ring or Ethernet) or may be proprietary. Crossbar like, direct connection architectures may be used between the gateways and other functional units on the bus (such as local ports on the local bus and adapter cards on the global bus) in lieu of bus architectures as well.

It was mentioned previously that queues are defined by two parameters: depth and service rate. So far queue depth and the mechanisms of servicing them have been described. However, additional means for improving the service rate of both the ingress queue and egress queue also exist. That is, recall in the aforementioned LAN switch embodiment the local bus 406 is oversubscribed to the global bus 407. Specifically, in one embodiment, the local bus 406 has a capacity of 2.56 Gbps while the global bus 407 has a capacity of 5.12 Gbps. In such cases, the egress queue may be swamped with offered load from the global bus. As such the egress queue may be filled and begin to drop traffic units. In order to reduce the rate of dropped traffic units, the service rate of the local bus 406 to the egress queue may expedited by various techniques.

A first technique concerns increasing the amount of time the local bus gateway 402 holds a token in order to empty out or reduce the number of traffic units within the egress queue. For example, as discussed, token passing schemes may be used to implement the various buses 406, 407. In normal operation, functional units attached to the local bus 406, such as ports 202a–d (referring briefly back to FIG. 2) and local bus gateway 402 must hold the token for a limited (or maximum) amount of time in order to implement "fairness". That is, the longer a functional unit holds a token to offload its traffic on the bus, the less fair it is to other functional units on the bus who also need to offload their traffic. For example, in one embodiment's normal operation the local bus gateway 402 must hold the token for no more than 1 ms. Again, this is typically done to implement fair utilization of local bus 406 resources by all functional units coupled to it 406.

However, in those instances where the egress queue is filled and begins to drop packets it may be more efficient from a system performance perspective to allow the local bus gateway 402 to increase the time in which it holds the token from the local bus 406 beyond the typically allowed maximum time. Alternatively, the token hold time may be increased if the state of a queue approaches or surpasses a critical percentage of its queue depth. This may involve another register such as critical percentage register 422 of FIG. 4.

The amount the token hold time is increased will depend on the oversubscription involved, the raw bandwidth of the local bus 406 and the depth of the egress queue. Thus the modulation of the token hold time to critical traffic conditions will vary from embodiment to embodiment. In the aforementioned LAN switch embodiment, the token hold time is allowed to increase from the normal mode of 1 ms to a maximum (i.e., non-normal operation) of 7 ms. In this same embodiment there is 1 ms resolution between the various token hold time settings.

The queue management layer 419 may dynamically set the token hold time via a register (e.g., token hold time register 420), which may be located in the local bus gateway 402 or may take the form of another register shared by the traffic control logic and the queue management layer 419. That is, by monitoring the traffic statistic registers (e.g., egress related registers 416, 417, and 418) the queue management layer 419 may recognize a high incidence of dropped traffic units at the egress queue and subsequently reset the token hold time register 420 such that the local bus gateway 402 increases the time it is allowed to hold tokens from the local bus 406 and offload traffic units in the egress queue.

In an alternate approach, the token request time may be shortened. That is, bus architectures may also implement fairness by (alternative to or in conjunction with limiting the token hold time) setting a minimum time between token requests by the local bus gateway 402. That is, for example, the local bus gateway 402 normally must wait at least 5 ms after releasing a token before requesting another one. By allowing the local bus gateway 402 to request subsequent tokens in shorter time periods than the normal or nominal time period (e.g., allow subsequent token requests in less than 5 ms of each other) under critical load conditions (e.g., surpassing a critical queue depth percentage), the service rate of the egress queue may be increased. Again, the time between token requests may be programmably set within a token request register (not shown in FIG. 4).

Another technique to increase the service rate of the egress queue, referred to as accelerated mode, incorporates intelligence into the local bus 406 and/or local bus gateway 402 such that the local bus 406 automatically devotes a fixed percentage of its bandwidth to the gateway 402 if the state of the egress queue reaches a critical percentage of its depth. For example, if the egress queue becomes 90% full, the local bus gateway 402 sets an accelerator net 421 which indicates to other functional units on the bus (who observe the net) they should reduce their request rate of the local bus 406. Alternatively, the accelerator net 421 may inform a bus master unit (e.g., bus master unit 208 of FIG. 2) that it should increase the rate of token request grants issued to the local bus gateway 402. Either of these rate changes reflect a dedication of the local bus 406 to offer a fixed percentage of its total bandwidth to the local bus gateway 402. In the aforementioned LAN switch embodiment, the fixed percentage in local bus 406 bandwidth is 50%, however other percentage values may be used depending on system parameters.

In this same LAN switch embodiment, the 50% utilization is implemented by giving every other token grant to the local bus gateway 402. For example, if the token first resides at a functional unit other than the local bus gateway 402, when that token first becomes available it must be given to the local bus gateway 402. Then, after the local bus gateway 402 releases the token it may be held by some other functional unit. After release of the token by this functional unit, the token must again be given to the local bus gateway 402. In this manner, the egress queue is guaranteed a service rate of 50% of the local bus 406 bandwidth.

Other percentages may be achieved by changing the above described interleaving rate of local bus token access to other functional unit token access. For example, if every third or fourth token (as opposed to every other token as above) is given to the local bus then the local bus gateway 402 enjoys 33% and 25% utilization of the local bus 406 respectively. If every two out of three tokens is granted to the local bus gateway 402 it enjoys 66% utilization, etc.

Furthermore, the critical percentage (i.e., the percentage the egress queue must fill up to in order to invoke the accelerated mode) may vary as well. In one embodiment, the critical percentage is hardwired into the logic. In another embodiment, the critical percentage may be programmed by the queue management layer 419. That is, the queue management layer may adjust the critical percentage via a critical percentage register 422. The critical percentage register 422 may be incorporated into the gateway 402 or associated between block 411 and the queue management layer 419. Regardless, logic associated with the register must monitor the egress state register 414 against the depth of the egress state to identify when the critical percentage is reached. Alternatively, such logic may dynamically calculate the percentage by monitoring the address of stored traffic units against the maximum (last) address location for the queue.

The accelerated mode may last until the egress queue is entirely empty or until some reduced percentage of the queue depth is consumed by traffic units in the queue. Again, this may be determined by the designer.

It is important to note that all the service rate techniques described so far (e.g., increasing token hold time, decreasing token request time, accelerated mode) may also be incorporated within the global bus gateway 403 and/or global bus 407. That is, although the previous examples were limited to traffic flow from the egress queue to local bus 406, they should not be construed to exclude application of these same techniques from the ingress queue to the global bus 407.

Another technique to effectively increase the service rate involves pre-emptive queuing. Pre-emptive queuing involves identifying certain traffic units (e.g., from a particular source ID) as priority which therefore receive preferential treatment through the system. The preferential treatment, embodied as pre-emptive queuing, means the priority traffic units are always placed ahead of non-priority traffic in a FIFO queue. In a sense, priority traffic units are placed at the head of line in comparison to non priority traffic units. In one approach, as discussed next, pre-emptive queuing is used in the ingress direction in order to handle the global bus's oversubscription to the system as a whole as discussed in reference to the aforementioned LAN switch embodiment.

Figure 5:
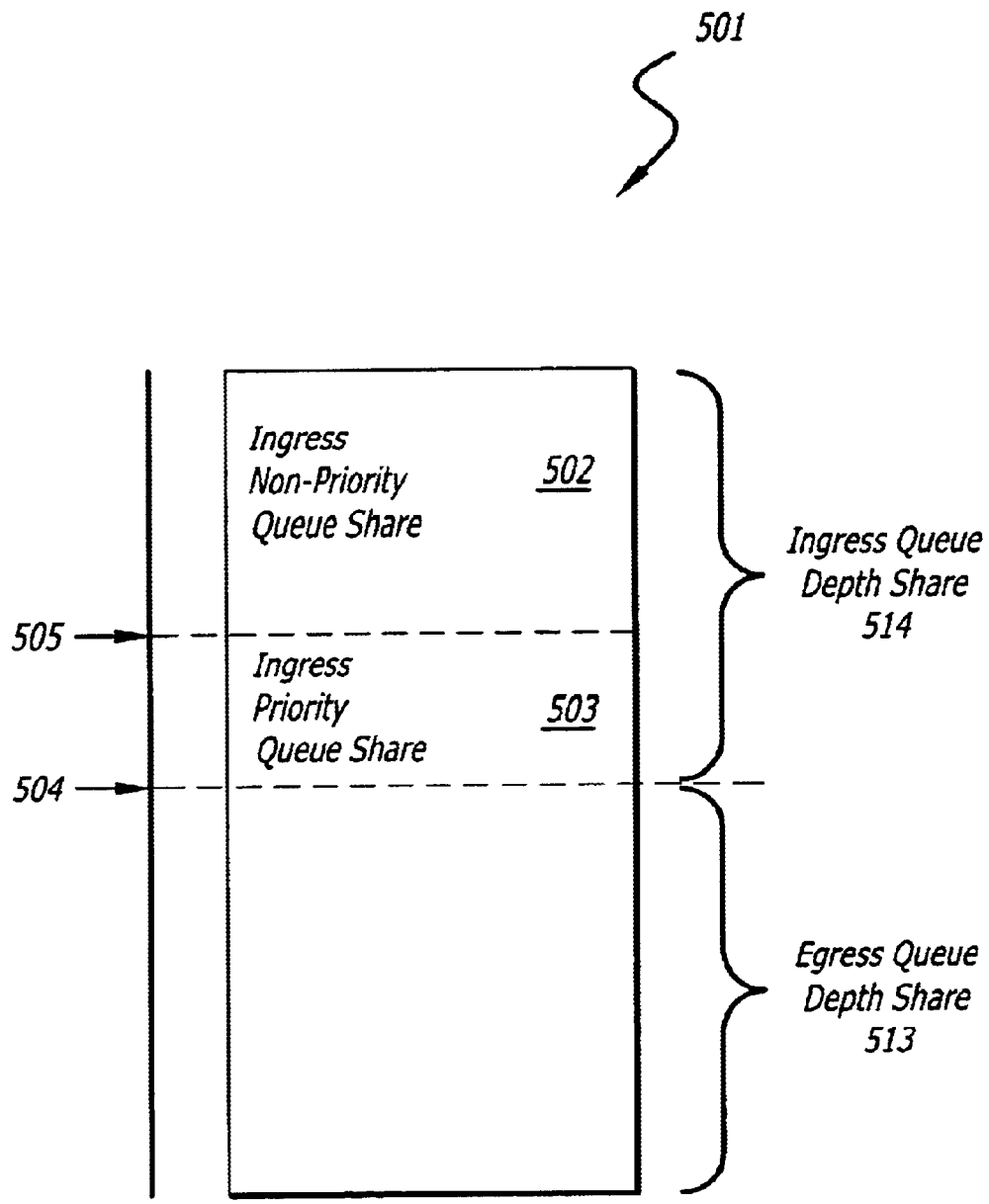
FIG. 5 shows a memory space configuration having a priority and a non-priority queue according to an embodiment of the invention.

FIG. 5 shows one embodiment of pre-emptive queuing. FIG. 5, shows the shared memory approach (similar to FIG. 3) of the egress and ingress queues. Notice, however, the ingress queue is split into separate queues: a priority queue (having a corresponding ingress priority queue share 503) and a non-priority queue (having a corresponding non-priority queue share 502). Both of these queue shares together correspond to the total ingress queue depth share 514. Note this embodiment implements pre-emptive queuing in the ingress direction.

Traffic units labeled priority (i.e., priority traffic units) are stored into the ingress priority queue share 503. These priority traffic units are always serviced before traffic units stored in the non-priority queue share 502. Thus they are guaranteed to be arrive at their destination (i.e., remote) adapter card before the neighboring non-priority traffic units stored in the ingress non-priority queue share 502. As such, the priority traffic units experience less propagation delay through the system.

Implementing a priority queue requires another boundary memory space setting 505. That is the boundary address setting 504 corresponds to the boundary address setting 303 of FIG. 3 which identifies the boundary between the egress and ingress queues. In FIG. 5, boundary address setting 505 identifies the boundary between the priority and non-priority ingress queues. Boundary address setting 505 may be anywhere within the ingress queue share space 501. Thus the proportion of the ingress queue depth share 514 consumed by the ingress priority queue share 503 is configurable.

Incorporating a pre-emptive queuing scheme via splitting the ingress queue into a priority and non priority queue may also involve the addition of further traffic statistic registers (not shown in FIG. 4). Essentially another queue depth register, state register, dropped and passed register may be added. These registers would operate much as described before.

That is, a third separate queue is added to the apparatus and method described with reference to FIG. 4. This would typically involve the introduction of an extra set of traffic statistic registers (such as state, dropped and passed registers); another queue depth register used to determine the depth of the priority queue and/or non-priority queue; additional threshold method functionality for determining whether or not there is room in the priority queue; dropping, storing functionality and servicing functionality as described before.

Again, it is important to note that pre-emptive queuing techniques may be applied to the egress queue as well. That is, although the previous example only concerned the ingress queue, it should be understood the egress queue may be similarly split into priority and non-priority shares.

Thus a translation layer suitable for local and global bus architectures has been described.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
   a) a local bus and a global bus;
   b) a memory resource to implement an ingress queue and an egress queue, said ingress queue to queue traffic units directed from said local bus to said global bus, said egress queue to queue traffic units directed from said global bus to said local bus, said memory resource divided into:
      1) an ingress queue depth share so as to define a depth of said ingress queue;
      2) an egress queue depth share so as to define a depth of said egress queue; and
   c) a register to store a memory space setting from which a boundary between said ingress queue and said egress queue can be determined within said memory resource, said boundary being dynamically configurable in light of traffic conditions so that said ingress queue depth share and said egress queue depth share can change in response to said traffic conditions.

2. The apparatus of claim 1 wherein said egress queue depth share and said ingress queue depth share.] add to 100% of said memory resource.

3. The apparatus of claim 1 wherein said memory resource further comprises a random access memory.

4. The apparatus of claim 1 wherein said ingress queue share can be further divided into a priority queue depth share and a non-priority queue depth share.

5. The apparatus of claim 4 further comprising a second register to store a second memory space setting that defines a boundary between said priority queue and said non priority queue within said ingress queue.

6. The apparatus of claim 1 further comprising register space to store a statistic of said traffic conditions.

7. The apparatus of claim 6 wherein said statistic is ingress traffic units dropped.

8. The apparatus of claim 6 wherein said statistic is egress traffic units dropped.

9. The apparatus of claim 6 wherein said statistic is ingress traffic units passed.

10. The apparatus of claim 6 wherein said statistic is egress traffic units passed.

11. The apparatus of claim 6 wherein said statistic is the state of said ingress queue.

12. The apparatus of claim 6 wherein said statistic is the state of said egress queue.

13. The apparatus of claim 1 further comprising register space to store a plurality of statistics associated with said traffic conditions, said plurality of statistics further comprising;
   1) ingress traffic units dropped;
   2) egress traffic units dropped;
   3) ingress traffic units passed;
   4) egress traffic units passed;
   5) the state of said ingress queue; and,
   6) the state of said egress queue.

14. The apparatus of claim 13 further comprising a different traffic statistic register for each of said statistics.

15. The apparatus of claim 1 further comprising traffic control logic to control entry of ingress traffic units into said ingress queue and entry of egress traffic units into said egress queue.

16. The apparatus of claim 15 wherein said traffic control logic causes an ingress traffic unit to be dropped if said ingress queue depth less the state of said ingress queue is an insufficient amount of memory space to queue said ingress traffic unit into said ingress queue.

17. The apparatus of claim 15 wherein said traffic control logic causes an egress traffic unit to be dropped if said egress queue depth less the state of said egress queue is an insufficient amount of memory space to queue said egress traffic unit into said egress queue.

18. The apparatus of claim 1 further comprising a queue management layer to determine said memory space setting in light of said traffic conditions.

19. The apparatus of claim 17 wherein said queue management layer is at least partially implemented as a microprocessor located on an adapter card.

20. The apparatus of claim 1 wherein said traffic unit is a packet.

21. The apparatus of claim 1 wherein said bus is a token based bus.

22. The apparatus of claim 1 further comprising a token hold time register to control how long a local bus gateway can hold onto a token that is passed over said local bus, said local bus gateway to control the presentation of egress traffic units onto said local bus.

23. The apparatus of claim 1 wherein said token hold time may be increased to increase a service rate of said egress queue in light of said traffic conditions.

24. The apparatus of claim 21 wherein said local bus further comprises an accelerator net that, when activated by a local bus gateway, causes said local bus gateway to gain greater control over said token as compared to other functional units that are attached to said local bus, said local bus gateway to control the presentation of egress traffic units onto said local bus.

25. A method, comprising:
   a) storing a first memory space setting within a register to help define a boundary between an ingress queue and egress queue within a memory resource, said ingress queue and said egress queue both implemented within said memory resource, said ingress queue to queue traffic units directed from a first bus to a second bus, said egress queue to queue traffic units from said second bus to said first bus;
   b) keeping track of a traffic statistic with a traffic statistic register; and
   c) storing a second memory space setting within said register to change a position of said boundary as a consequence of a value of said traffic statistic held within said traffic statistic register.

26. The method of claim 25 wherein said traffic statistic is said ingress queue's dropped traffic units.

27. The method of claim 25 wherein said traffic statistic is said egress queue's dropped traffic units.

28. The method of claim 25 wherein said traffic statistic is said ingress queue's passed traffic unit.

29. The method of claim 25 wherein said traffic statistic is said egress queue's passed traffic units.

30. The method of claim 25 further comprising:
   monitoring address lines on one of said busses to recognize a traffic unit on said one bus is destined for the other of said busses;
   comparing the state of whichever of said queues is to queue said traffic unit as it travels from said one bus to said other bus against its depth in response to said recognition of said traffic unit; and
   storing said traffic unit in said one queue if said state is less than said depth.

31. The method of claim 30 further comprising incrementing a passed traffic unit register if said state is less than said depth.

32. The method of claim 30 further comprising incrementing a state register if said state is equal to said depth.

33. The method of claim 30 further comprising flushing said traffic unit if said state is equal to said depth.

34. The method of claim 30 further comprising incrementing a dropped traffic unit register if said state is equal to said depth.

35. A method comprising:
   a) incrementing a traffic statistic register in response to a decision to store a traffic unit into a queue;
   b) comparing the state of said queue against the depth of said queue; and
   c) increasing a service rate of said queue if said queue state exceeds a critical percentage of said queue depth, said increasing a service rate caused by increasing a token hold time of a gateway, said gateway to control the presentation onto a bus of traffic units that are removed from said queue, said token used to control use of said bus.

36. The method of claim 35 wherein said critical percentage is 100%.

37. The method of claim 35 further comprising programming a token hold time value into a service request register in order to cause said increase in said service rate.

38. The method of claim 35 wherein said traffic statistic register is a passed traffic unit register.

39. The method of claim 35 further comprising incrementing a second traffic statistic register in response to a decision to drop a traffic unit that was to be entered into said queue, said second traffic statistic register being a dropped traffic unit register.

40. The method of claim 35 wherein said increasing a service rate of said queue further comprises granting said gateway a higher percentage of the bandwidth of said bus than said gateway enjoyed just prior to said granting.

41. The method of claim 35 wherein said increasing a service rate of said queue further comprises forcing a bus master to increase the rate at which service requests by a gateway are granted.

42. The method of claim 35 wherein said traffic unit is an egress traffic unit and said queue is a egress queue.

43. The method of claim 42 further comprising storing priority ingress traffic units into a priority ingress queue and storing non-priority ingress traffic units into a non-priority ingress queue, said non-priority ingress queue and said priority ingress queue sharing a memory resource with said queue.

44. A machine readable medium having stored thereon sequences of instructions, which when executed by a processor, cause said processor to perform the acts of:
   a) incrementing a traffic statistic register in response to a decision to store a traffic unit into a queue;
   b) comparing the state of said queue against the depth of said queue; and
   c) increasing a service rate of said queue if said queue state exceeds a critical percentage of said queue depth, said increasing a service rate caused by increasing a token hold time of a gateway, said gateway to control the presentation onto a bus of traffic units that are removed from said queue, said token used to control use of said bus.

45. An adapter card, comprising:
   a) a memory resource to implement a first queue and a second queue, said first queue to queue traffic units directed from a first bus to a second bus, said second queue to queue traffic units directed from said second bus to said first bus, said memory resource divided into:
      1) a first queue depth share so as to define a depth of said first queue;
      2) a second queue depth share so as to define a depth of said second queue; and
   b) a register to store a memory space setting from which a boundary between said first queue and said second queue can be determined within said memory resource, said boundary being dynamically configurable in light of traffic conditions so that said first queue depth share and said second queue depth share can change in response to said traffic conditions.

* * * * *